United States Patent
Nakamaru et al.

(10) Patent No.: US 7,361,395 B2
(45) Date of Patent: Apr. 22, 2008

(54) SYNCHRONIZER RING

(75) Inventors: Takashi Nakamaru, Fujisawa (JP); Satoshi Takamura, Fujisawa (JP); Kunio Nakashima, Tateyama-machi (JP); Wataru Yago, Tateyama-machi (JP); Kenichi Ichida, Tateyama-machi (JP); Atsushi Yasukawa, Tateyama-machi (JP); Shigeyuki Aburatani, Tateyama-machi (JP)

(73) Assignees: Oiles Corporation, Tokyo (JP); Chuetsu Metal Works Co., Ltd., Toyama (JP)

( * ) Notice: Subject to any disclaimer, the term of this patent is extended or adjusted under 35 U.S.C. 154(b) by 215 days.

(21) Appl. No.: 10/560,028

(22) PCT Filed: Jun. 7, 2004

(86) PCT No.: PCT/JP2004/007937

§ 371 (c)(1),
(2), (4) Date: Dec. 8, 2005

(87) PCT Pub. No.: WO2004/111479

PCT Pub. Date: Dec. 23, 2004

(65) Prior Publication Data

US 2006/0121235 A1    Jun. 8, 2006

(30) Foreign Application Priority Data

Jun. 10, 2003    (JP) .............................. 2003-165707

(51) Int. Cl.
*B32B 3/02*    (2006.01)

(52) U.S. Cl. .................. 428/66.2; 428/66.6; 428/66.1; 428/66.7; 192/107 M (58) Field of Classification Search .............. 426/66.2, 426/66.6, 66.1, 66.7; 192/107 M, 251 A
See application file for complete search history.

(56) References Cited

U.S. PATENT DOCUMENTS 5,370,725 A    12/1994    Kawamura et al.
5,969,001 A    10/1999    Kawai

FOREIGN PATENT DOCUMENTS

| DE | 43 40 758 A1 | 6/1994 |
|---|---|---|
| EP | 0 790 432 A1 | 8/1997 |
| GB | 2 272 908 A | 6/1994 |
| JP | 07-110037 | 4/1995 |
| JP | 7-110037 A | 4/1995 |
| JP | 09-221553 | 8/1997 |
| JP | 9-221553 A | 8/1997 |
| JP | 11-061103 | 3/1999 |

(Continued)

OTHER PUBLICATIONS

International Search Report of PCT/JP2004/007937, mailed Sep. 28, 2004.

*Primary Examiner*—Alexander Thomas
(74) *Attorney, Agent, or Firm*—Nixon & Vanderhye P.C.

(57) ABSTRACT

A synchronizer ring 1 has an annular ring body 2; a friction material 4 joined integrally to a cylindrical inner peripheral surface 3 of the ring body 2; a conical surface 5 formed on an inner surface of the friction material 4; and a plurality of annular grooves 6 formed in the conical surface 5 of the friction material 4.

7 Claims, 3 Drawing Sheets

FOREIGN PATENT DOCUMENTS

| | | |
|---|---|---|
| JP | 11-61103 A | 3/1999 |
| JP | 2001-170453 | 6/2001 |
| JP | 2001-170453 A | 6/2001 |
| JP | 2001-355030 | 12/2001 |
| JP | 2001-355030 A1 | 12/2001 |
| JP | 2002-021898 | 1/2002 |
| JP | 2002-21898 A | 1/2002 |
| JP | 2002-90048 | 3/2002 |
| JP | 2002-090048 | 3/2002 |

SYNCHRONIZER RING

This application is the US national phase of international application PCT/JP2004/007937, filed 7 Jun. 2004, which designated the U.S. and claims priority of JP 2003-165707, filed 10 Jun. 2003, the entire contents of each of which are hereby incorporated by reference.

TECHNICAL FIELD

The present invention relates to a synchronizer ring for use in a manual transmission of an automobile.

BACKGROUND ART

A synchronizer ring is a ring-like member which is incorporated in a transmission of an automobile and which, at the time of a gear shifting operation of the transmission, synchronously rotates two gears so that the two gears which are engaged in the shift can be smoothly engaged with each other. Characteristics required for the synchronizer ring are, among others, (1) that the coefficient of dynamic friction with respect to a mating member is large in order to synchronize two gears by frictionally engaging a tapered portion which is the mating member, and (2) that the synchronizer ring has wear resistance in sliding with the mating member and the like.

Patent document 1: JP-B-7-107182

Patent document 2: JP-B-47-24053

DISCLOSURE OF THE INVENTION

Problems to be Solved by the Invention

Conventionally, synchronizer rings made of Cu—Zn-based high strength brass (refer to patent document 1) and synchronizer rings made of Cu—Al-based aluminum bronze are frequently used as the synchronizer rings. However, in conjunction with tendencies toward higher outputs and higher torques of automobiles and the like in recent years, an excessively large load has come to be applied to the synchronizer ring during the shift. Therefore, there is a problem in that a Cu-based synchronizer ring, which has a small coefficient of dynamic friction, does not satisfy the aforementioned characteristic (1). Furthermore, there is a problem in that the aforementioned characteristic (1) is neither satisfied by a synchronizer ring in which molybdenum (Mo) is thermally sprayed onto a tapered surface of an iron-based ring.

As a synchronizer ring which overcomes the problem of the aforementioned Cu-based synchronizer ring, a synchronizer ring has been proposed in which the tapered surface of a metallic ring is lined with a friction material whose principal material is fibrous (refer to patent document 2). However, with the synchronizer ring disclosed in this patent document 2, the coefficient of friction in an initial period is extremely high, and the coefficient of friction suddenly drops as the shift is repeated in terms of its number of times, so that there is still the problem that aforementioned characteristic (1) is not satisfied.

The present invention has been devised in view of the above-described circumstances, and its object is to provide a synchronizer ring which excels in friction-wear characteristics and has the aforementioned characteristics (1) and (2).

Means for Solving the Problems

The synchronizer ring in accordance with the present invention comprises: an annular ring body, wherein a friction material is integrally joined to at least one of an inner peripheral surface and an outer peripheral surface of the ring body, the friction material containing a phenol resin in which 40 to 70 wt. % of a porous carbon powder containing mineral components is dispersedly contained.

According to the synchronizer ring in accordance with the invention, the friction material which is joined to at least one of the inner peripheral surface and the outer peripheral surface of the ring body has a phenol resin and a porous carbon powder containing mineral components dispersedly contained in the phenol resin at a ratio of 40 to 70 wt. %. The surface of the friction material is made porous as the porous carbon powder is exposed on the surface. Therefore, when the surface of the friction material is brought into frictional contact with a mating member in oil, an oil film is difficult to be formed on a friction interface, so that the coefficient of dynamic friction can be made large.

In the present invention, the annular ring body may be formed of one of iron, an iron-based alloy, a non-ferrous alloy such as a copper alloy, and a sintered alloy thereof.

In the present invention, the porous carbon powder containing mineral components may contain 65 to 75 wt. % of a carbon component, 5 to 10 wt. % of mineral components, and 15 to 30 wt. % of oxygen.

This porous carbon powder containing mineral components contributes to improvement of the wear resistance of the friction material since mineral components (Na, Mg, P, and K) contained in the porous carbon powder are interposed at the friction interface in the contact with the mating member in oil. The effect due to these mineral components is not clear. However, since the above-described effect is demonstrated despite the fact that the carbon component in the porous carbon powder is not utterly graphitized and does not have a low friction characteristic such as that of ordinary graphite, it can be conjectured that the mineral components exhibit the action of preventing direct contact at the friction interface between the carbon component and the mating member owing to the contact with the oil.

In the present invention, the phenol resin may be one or two or more kinds selected from a novolak type phenol resin, an epoxy modified phenol resin, and a melamine modified phenol resin.

The phenol resin performs the function of a cementing material for joining porous carbon particles to each other dispersedly contained in the resin and for joining the friction material to at least one of the inner peripheral surface and the outer peripheral surface of the ring body. A novolak type phenol resin, in particular, is preferable since it facilitates compatibility at the time of fabricating the friction material. In addition, the relative amount of the phenol resin in the friction material requires sufficient caution since it affects the swelling of the friction material in oil. In the present invention, it was confirmed that 30 to 60 wt. % is appropriate as the amount of the phenol resin in the friction material.

In the synchronizer ring in accordance with the invention, the friction material may, moreover, contain an inorganic whisker and/or a porous ceramic, i.e., at least one of an inorganic whisker and a porous ceramic, at a ratio of 5 to 30 wt. %. The inorganic whisker may be one or two or more kinds selected from a calcium sulfate whisker, a potassium titanate whisker, a zinc oxide whisker, a magnesium sulfate whisker, an aluminum borate whisker, a calcium silicate whisker, and a titanium oxide whisker.

These inorganic whiskers perform the function of remarkably improving the wear resistance of the friction material by being compounded with the phenol resin and the porous carbon powder mentioned above. The fiber length of the inorganic whiskers is 10 to 100 μm, and inorganic whiskers having a fiber length of approximately 50 μm are preferable to allow a uniform dispersion in the friction material to take place.

In addition, the porous ceramic may be selected from at least one of activated alumina and activated magnesia. By being compounded with the phenol resin and the porous carbon powder mentioned above, or by being compounded with the phenol resin, the porous carbon powder, and the inorganic whisker, this porous ceramic performs the function of remarkably improving the wear resistance of the friction material. The average particle size of the porous ceramic is preferably 0.5 to 10 μm or thereabouts.

Furthermore, the compounding amount of the inorganic whisker and/or the porous ceramic is preferably 5 to 30 wt. %, more preferably 10 to 20 wt. %. If the compounding amount is less than 5 wt. %, a desirable effect on the improvement of the wear resistance of the friction material is not exhibited. On the other hand, if compounding is effected in excess of 30 wt. %, the proportion of exposure on the surface of the friction material becomes large, and the effect on the wear resistance of the porous carbon powder in the friction material is not only reduced, but the drawback that damage is caused to the mating member appears.

ADVANTAGES OF THE INVENTION

According to the synchronizer ring in accordance with the present invention, the friction material which is integrally joined to at least one conical surface of the inner surface and the outer surface of the annular ring body has a high coefficient of dynamic friction and wear resistance in the sliding friction with a mating member. Therefore, it is possible to prolong the usable life of the synchronizer ring, and allow the synchronous rotation of two gears to be effected reliably at the time of the gear shifting operation of the transmission.

BEST MODE FOR CARRYING OUT THE INVENTION

Hereafter, a detailed description will be given of an embodiment of the invention.

A description will be given of a porous carbon powder containing mineral components, which is used in the invention.

<Method of Manufacturing Porous Carbon Particles>

The method of manufacturing porous carbon particles comprises: (1) the step of preparing a bran by defatting a bran such as rice bran and wheat bran and by adjusting its particle size; (2) the step of adding to the bran with its particle size adjusted a phenol resin as a thermosetting synthetic resin and water or an aqueous solution containing an appropriate amount of an adhesive paste, then mixing them, and subsequently granulating the mixture into a predetermined particle size; and (3) the step of carbonizing and calcinating the granulated granules in an atmosphere of an inert gas or in a vacuum at temperatures of 900 to 1100° C. The porous carbon powder (particles) is manufactured through these steps (1) to (3).

The porous carbon powder obtained by the above-described manufacturing method contains 65 to 75 wt. % of a carbon component, 5 to 10 wt. % of mineral components, and 15 to 30 wt. % of oxygen. The hardness of the porous carbon powder is generally 440 Hv (Vickers hardness). As a specific example of this porous carbon powder, for example, "Powder RBC" which is commercially available from Sanwa Oil and Fat Co., Ltd. can be cited as a preferable one.

The phenol resin performs the function of joining the porous carbon particles to each other dispersedly contained in the resin and the function of a cementing material for joining a friction material to at least one of an inner peripheral surface and an outer peripheral surface of a ring body, and may be selected from one or two or more kinds of a novolak type phenol resin, an epoxy modified phenol resin, and a melamine modified phenol resin. The novolak type phenol resin, in particular, is preferable since it facilitates compactibility at the time of fabricating the friction material. In addition, the relative amount of the phenol resin in the friction material requires sufficient caution since it affects the swelling of the friction material in oil. In the present invention, it was confirmed that 30 to 60 wt. % is appropriate as the amount of the phenol resin in the friction material.

In the synchronizer ring in accordance with the invention, it is possible to use a friction material in which a predetermined amount of an inorganic whisker and/or a porous ceramic is compounded with the phenol resin and the porous carbon powder containing mineral components, for the purpose of further improving the wear resistance. The inorganic whisker may be selected from one or two or more kinds of a calcium sulfate whisker, a potassium titanate whisker, a zinc oxide whisker, a magnesium sulfate whisker, an aluminum borate whisker, a calcium silicate whisker, and a titanium oxide whisker. In addition, the porous ceramic may be selected from at least one of activated alumina and activated magnesia. The compounding amount of the inorganic whisker and/or the porous ceramic is preferably 5 to 30 wt. %, more preferably 10 to 20 wt. %. If the compounding amount is less than 5 wt. %, a desirable effect on the improvement of the wear resistance of the friction material is not exhibited. On the other hand, if compounding is effected in excess of 30 wt. %, the proportion of exposure of the inorganic whisker and/or the porous ceramic on the surface of the friction material becomes large, which not only reduces the effect on the wear resistance of the porous carbon particles in the friction material, but the drawback of causing damage to the mating member appears.

The friction material consisting of the above-described component composition is fabricated into a uniform mixture by an ordinary mixing method, by compounding a phenol resin and a porous carbon powder containing mineral components, or a phenol resin, a porous carbon powder containing mineral components, and an inorganic whisker at a respective predetermined ratio, and by charging them into a mixer such as a Henschel mixer.

Next, referring to the drawings, a description will be given of a method of manufacturing a synchronizer ring using this mixture.

<First Manufacturing Method>

A mixture of a phenol resin and a porous carbon powder containing mineral components, or a mixture of a phenol resin, a porous carbon powder containing mineral components, an inorganic whisker and/or a porous ceramic, which are compounded at a predetermined ratio, is filled into a mold, and is subjected to compression molding at temperatures of 180 to 300° C., to thereby fabricate a hollow cylindrical friction material consisting of the mixture. This friction material is integrally joined through an adhesive to a cylindrical inner peripheral surface of the ring body formed of iron, a ferroalloy, a non-ferrous alloy, or a sintered alloy thereof. Then, a cylindrical inner surface of the friction material is formed into a conical surface by machining, thereby fabricating a synchronizer ring in which the friction material is integrally joined to the inner peripheral surface of the ring body. In the synchronizer ring thus fabricated, in a case where annular grooves are required in the conical surface of the friction material, it suffices if the annular grooves are formed, as required, by subjecting the conical surface of the friction material to machining.

Figure 1:
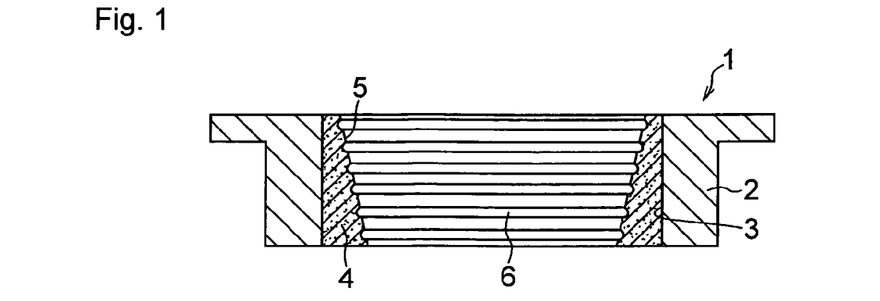
FIG. 1 is a longitudinal cross-sectional view illustrating an embodiment of the synchronizer ring of the present invention.

FIG. 1 shows a synchronizer ring fabricated by the above-described first manufacturing method. A synchronizer ring 1 includes an annular ring body 2; a friction material 4 joined integrally to a cylindrical inner peripheral surface 3 of the ring body 2; a conical surface 5 formed on the inner surface of the friction material 4; and a plurality of annular grooves 6 formed in the conical surface 5 of the friction material 4.

Figure 2:
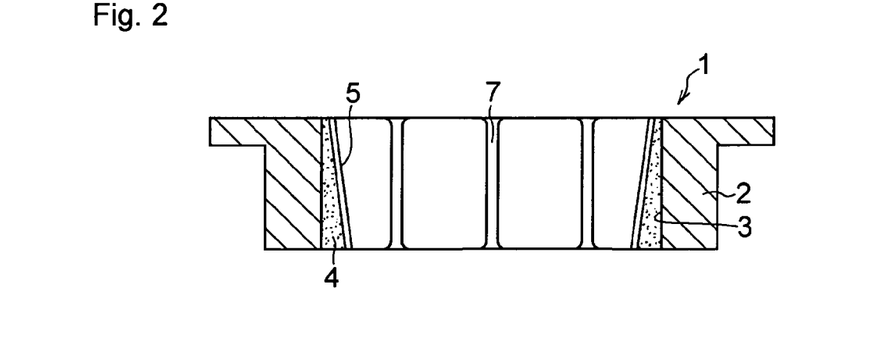
FIG. 2 is a longitudinal cross-sectional view illustrating another embodiment of the synchronizer ring of the present invention.

In addition, in the above-described first manufacturing method, the synchronizer ring can also be fabricated by filling the mixture into the mold and subjecting the mixture to compression molding at temperatures of 180 to 300° C. to thereby fabricate a friction material which consists of the mixture, has a cylindrical surface on its outer surface, and has on its inner surface a conical surface and a plurality of elongated grooves extending through in a longitudinal direction, and then by integrally joining this friction material to the cylindrical inner peripheral surface of the ring body through an adhesive. In the synchronizer ring fabricated by this method with the above-described manufacturing method, it is possible to omit the step of forming the cylindrical inner surface of the friction material into a conical surface by machining. Further, in a case where, in addition to the elongated grooves, annular grooves are required in the conical surface of the friction material, it suffices if the annular grooves are formed, as required, by subjecting the conical surface of the friction material to machining. FIG. 2 shows a synchronizer ring fabricated by this manufacturing method. The synchronizer ring 1 includes the annular ring body 2; the friction material 4 joined integrally to the cylindrical inner peripheral surface 3 of the ring body 2; the conical surface 5 formed on the inner surface of the friction material 4; and a plurality of vertical grooves 7 formed in the conical surface 5.

Figure 3:
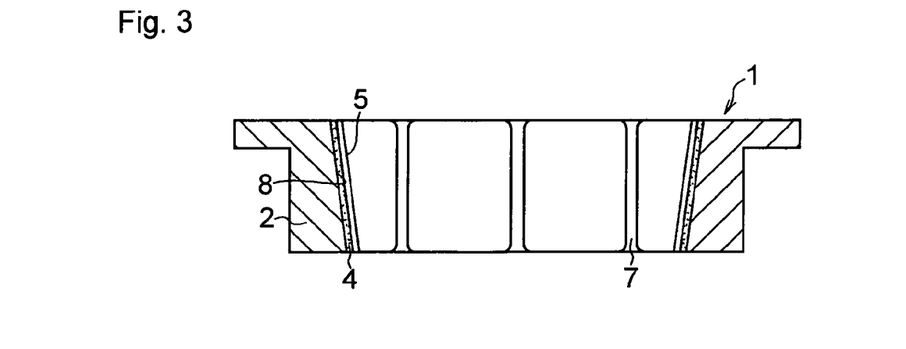
FIG. 3 is a longitudinal cross-sectional view illustrating still another embodiment of the synchronizer ring of the present invention.

Furthermore, in the above-described first manufacturing method, the synchronizer ring can also be fabricated by filling the mixture into the mold and subjecting the mixture to compression molding at temperatures of 180 to 300° C. to thereby fabricate a friction material consisting of the mixture and having conical surfaces on its inner and outer surfaces and the plurality of elongated grooves extending through on the conical surface of the inner surface in the longitudinal direction, and then by integrally joining this friction material to the conical inner peripheral surface of the ring body through an adhesive. Also in the synchronizer ring fabricated by this method, in a case where annular grooves are required on the conical surface of the inner surface of the friction material, it suffices if the annular grooves are formed, as required, by subjecting the conical surface of the inner surface of the friction material to machining. FIG. 3 shows a synchronizer ring fabricated by this manufacturing method. The synchronizer ring 1 includes the annular ring body 2; the friction material 4 joined integrally to a conical inner peripheral surface 8 of the ring body 2; the conical surface 5 of the inner surface of the friction material 4; and the plurality of vertical grooves 7 formed in the conical surface 5.

Figure 4:
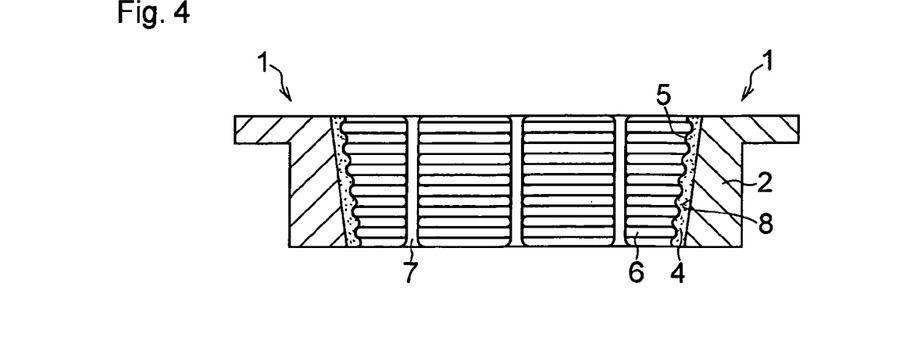
FIG. 4 is a longitudinal cross-sectional view illustrating a further embodiment of the synchronizer ring of the present invention.

In addition, FIG. 4 shows the synchronizer ring 1 in which a plurality of annular grooves are further formed in the conical surface 5 of the inner surface of the friction material 4 of the synchronizer ring 1 shown in FIG. 3. The synchronizer ring 1 includes the annular ring body 2; the friction material 4 joined integrally to the conical inner peripheral surface 8 of the ring body 2; the conical surface 5 of the inner surface of the friction material 4; the plurality of vertical grooves 7 formed in the conical surface 5; and the plurality of annular grooves 6 formed in the conical surface 5.

<Second Manufacturing Method>

A ring body similar to the above-described one is disposed in a forming mold, and a mixture similar to the above-described one is filled over the cylindrical outer peripheral surface of this ring body and is subjected to compression molding at temperatures of 180 to 300° C., to integrally join to the outer peripheral surface of the ring body a friction material having on its outer surface a conical surface and a plurality of elongated grooves extending through in the longitudinal direction. A synchronizer ring is thereby fabricated in which the friction material is integrally joined to the outer peripheral surface of the ring body. Also in the synchronizer ring fabricated by this method, in the case where annular grooves are required in the conical surface of the friction material, it suffices if the annular grooves are formed, as required, by subjecting the conical surface of the friction material to machining.

Figure 5:
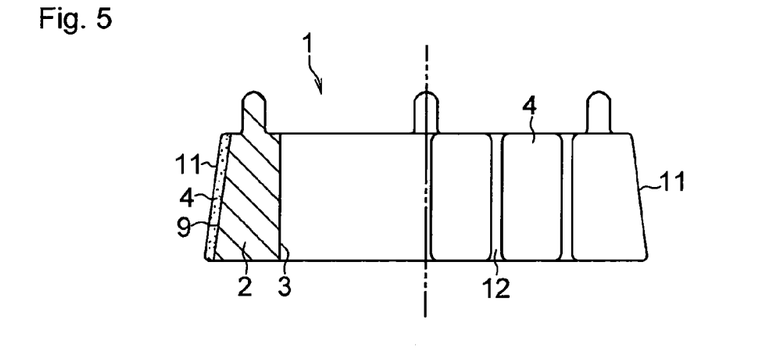
FIG. 5 is a partial longitudinal cross-sectional view illustrating a still further embodiment of the synchronizer ring of the present invention.

In the above-described second manufacturing method, a synchronizer ring in which a friction material is integrally joined to at least one of an inner peripheral surface and an outer peripheral surface, which is formed in a conical shape, of the ring body may be formed as follows: The ring body in which at least one of the inner peripheral surface and the outer peripheral surface thereof is formed in the conical shape is disposed in the forming mold. The mixture is then filled over the at least one of the inner peripheral surface and the outer peripheral surface, which is formed in the conical shape, of this ring body, and is subjected to compression molding at temperatures of 180 to 300° C. The friction material having a plurality of elongated grooves extending through in the longitudinal direction is thereby integrally joined to the at least one of the inner peripheral surface and the outer peripheral surface, which is formed in the conical shape, of the ring body. Also in the synchronizer ring fabricated by this method, in the case where annular grooves are required in the conical surface of the friction material, it suffices if the annular grooves are formed, as required, by subjecting the conical surface of the friction material to machining. FIG. 5 shows a synchronizer ring fabricated by this manufacturing method. The synchronizer ring 1 includes the ring body 2 having the cylindrical inner peripheral surface 3 and a conical outer peripheral surface 9; the friction material 4 joined integrally to the conical outer peripheral surface 9 of the ring body 2 and having a conical surface 11; and a plurality of vertical grooves 12 formed in the conical surface 11 of the friction material 4 in such a manner as to extend through in the longitudinal direction.

Figure 6:
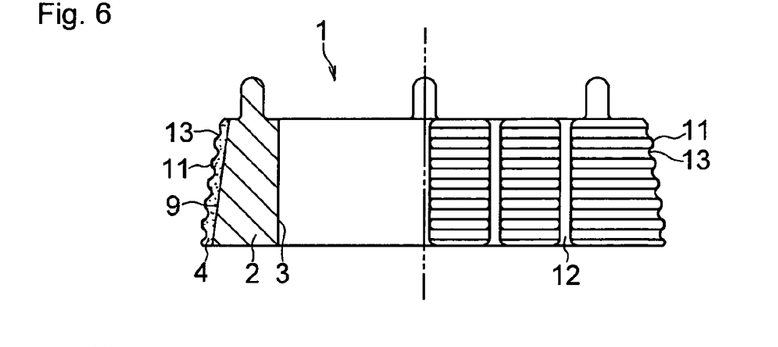
FIG. 6 is a partial longitudinal cross-sectional view illustrating a further embodiment of the synchronizer ring of the present invention.

In addition, FIG. 6 shows the synchronizer ring 1 in which a plurality of annular grooves 13 are further formed in the conical surface 11 of the friction material 4 of the synchronizer ring 1 shown in FIG. 5. The synchronizer ring 1 includes the ring body 2 having the cylindrical inner peripheral surface 3 and the conical outer peripheral surface 9; the friction material 4 joined integrally to the conical outer peripheral surface 9 of the ring body 2 and having the conical surface 11 on its outer surface; the plurality of vertical grooves 12 formed in the conical surface 11 of the friction material 4 in such a manner as to extend through in the longitudinal direction; and the plurality of annular grooves 13 formed in the conical surface 11 of the friction material 4.

Figure 7:
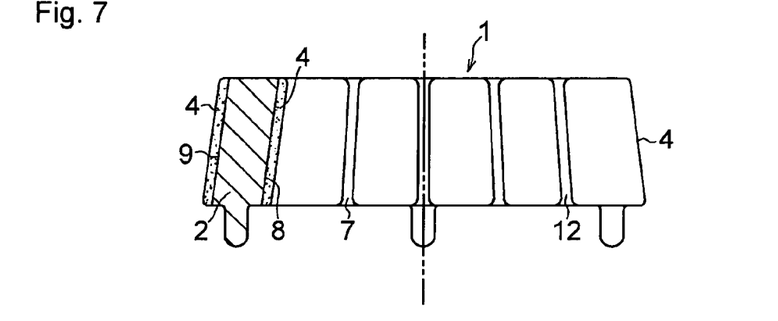
FIG. 7 is a partial longitudinal cross-sectional view illustrating a further embodiment of the synchronizer ring of the present invention.
Figure 8:
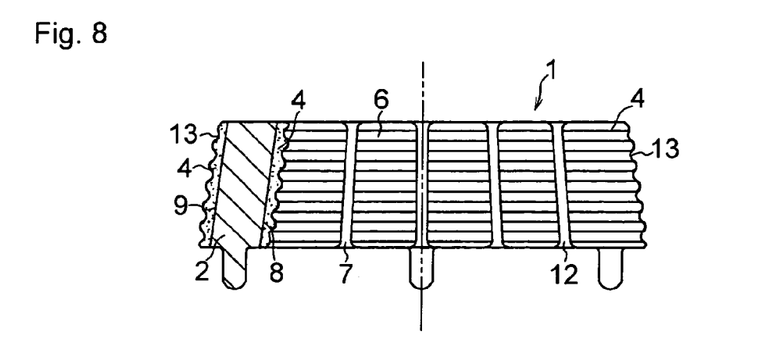
FIG. 8 is a partial longitudinal cross-sectional view illustrating a further embodiment of the synchronizer ring of the present invention.

FIG. 7 shows a synchronizer ring fabricated by the above-described second method. The synchronizer ring 1 shown in FIG. 7 includes the ring body 2 having the conical inner peripheral surface 8 and the conical outer peripheral surface 9; the friction materials 4, 4 respectively joined integrally to the conical inner peripheral surface 8 and the conical outer peripheral surface 9 of the ring body 2; and the plurality of elongated vertical grooves 7, 12 formed respectively in the friction materials 4, 4 in such a manner as to extend through in the longitudinal direction. FIG. 8 shows the synchronizer ring 1 in which the plurality of annular grooves 6, 13 are further formed in the friction materials 4, 1 respectively joined integrally to the conical inner peripheral surface 8 and the conical outer peripheral surface 9 of the synchronizer ring 1 shown in FIG. 7. The synchronizer ring 1 includes the ring body 2 having the conical inner peripheral surface 8 and the conical outer peripheral surface 9; the friction materials 4, 4 respectively joined integrally to the conical inner peripheral surface 8 and the conical outer peripheral surface 9 of the ring body 2; the plurality of vertical grooves 7, 12 formed respectively in the friction materials 4, 4 in such a manner as to extend through in the longitudinal direction; and the plurality of annular grooves 6, 13 formed respectively in the friction materials 4, 4.

<Third Manufacturing Method>

In the above-described second manufacturing method, the synchronizer ring is fabricated by integrally joining a friction material consisting of the mixture to the cylindrical outer peripheral surface of the ring body or at least one of the conical inner peripheral surface 8 and the conical outer peripheral surface 9 of the ring body by injection molding, instead of integrally joining the friction material consisting of the mixture to the cylindrical outer peripheral surface of the ring body or at least one of the conical inner peripheral surface 8 and the conical outer peripheral surface 9 of the ring body by compression molding. Also in the synchronizer ring fabricated by this method, in the case where annular grooves are required in the conical surface of the friction material, it suffices if the annular grooves are formed, as required, by subjecting the conical surface of the friction material to machining.

In the synchronizer ring fabricated by any one of the above-described manufacturing methods, a friction material consisting of a mixture of a phenol resin and a porous carbon powder containing mineral components, or a mixture of a phenol resin, a porous carbon powder containing mineral components, an inorganic whisker and/or a porous ceramic, is integrally joined to the inner peripheral surface of the ring body or the inner peripheral surface and the outer peripheral surface thereof. Therefore, in the frictional sliding with respect to a mating member, the aforementioned characteristics are demonstrated, i.e., the characteristics: (1) that the coefficient of dynamic friction with respect to a mating member is large in order to synchronize the two gears by frictionally engaging a tapered portion which is the mating member, and that (2) the synchronizer ring has wear resistance in sliding with the mating member.

EXAMPLES

Hereafter, a detailed description will be given of the present invention on the basis of examples. It should be noted that the present invention is not limited to the examples.

Examples 1 to 3

A porous carbon powder with an average particle size of 150 μm containing 72.8 wt. % of a carbon component, 19.8 wt. % of oxygen, and 7.4 wt. % of mineral components (Na:1.9 wt. %, Mg:0.8 wt. %, P:2.8 wt. %, and K:1.9 wt. %) was prepared, and 50 to 70 wt. % of this porous carbon powder and 30 to 50 wt. % of a novolak type phenol resin were charged into a Henschel mixer and were mixed for 5 minutes, thereby obtaining a mixture.

A ring body made of a copper alloy was prepared, the ring body was disposed in advance in a forming mold, and the mixture was filled on the inner surface of the ring body. Then, heating was effected to a temperature of 300° C., and compression molding was effected, to thereby integrally join the friction material to the inner surface of the ring body. After molding, the assembly was removed from the mold, the inner surface of the friction material was machined into a conical surface, and annular grooves were formed in the conical surface of the friction material by machining. Thus, a synchronizer ring in which the friction material was integrally joined to the inner surface of the ring body was fabricated.

Examples 4 to 9

A porous carbon powder similar to that of the above-described Examples was prepared, and a calcium sulfate whisker, a potassium titanate whisker, and an aluminum borate whisker having a fiber length of 50 μm were prepared as inorganic whiskers serving as wear resistance improving agents. Then, 50 wt. % of the porous carbon powder, 0 to 20 wt. % of the inorganic whisker, and 30 to 40 wt. % of the novolak type phenol resin were charged into the Henschel mixer and were mixed for 5 minutes, thereby obtaining a mixture. Thereafter, a synchronizer ring in which the friction material was integrally joined to the inner surface of the ring body was fabricated in a method similar to that of the above-described Examples.

Examples 10 to 12

A porous carbon powder similar to that of the above-described Examples was prepared. Activated alumina having an average particle size of 0.5 μl as a porous ceramic and a potassium titanate whisker having a fiber length of 50 μm as an inorganic whisker, which serve as wear resistance improving agents, were respectively prepared. Then, a mixture obtained by charging into the Henschel mixer 50 to 60 wt. % of the porous carbon powder, 10 to 20 wt. % of the activated alumina, and 30 wt. % of the novolak type phenol resin and by mixing them for 5 minutes, as well as a mixture obtained by charging into the Henschel mixer 50 wt. % of the porous carbon powder, 10 wt. % of the activated alumina, 10 wt. % of the potassium titanate whisker, and 30 wt. % of the novolak type phenol resin and by mixing them for 5 minutes, were respectively prepared. Thereafter, a synchronizer ring in which the friction material was integrally joined to the inner peripheral surface of the ring body was fabricated in a method similar to that of the above-described Examples.

Comparative Example 1

40 wt. % of a carbon fiber, 20 wt. % of a calcium silicate powder, 10 wt. % of brass powder, and 30 wt. % of the novolak type phenol resin were charged into the Henschel mixer and were mixed for 5 minutes, thereby obtaining a mixture. Thereafter, a synchronizer ring in which the friction material was integrally joined to the inner surface of the ring body was fabricated in a method similar to that of the above-described Examples.

Comparative Example 2

A porous carbon powder similar to that of the above-described Example 1 was prepared, and 30 wt. % of this porous carbon powder and 70 wt. % of the novolak type phenol resin were charged into the Henschel mixer and were mixed for 5 minutes, thereby obtaining a mixture. Thereafter, a synchronizer ring in which the friction material was integrally joined to the inner surface of the ring body was fabricated in a method similar to that of the above-described Examples.

Comparative Example 3

A porous carbon powder similar to that of the above-described Example 1 was prepared, and 80 wt. % of this porous carbon powder and 20 wt. % of the novolak type phenol resin were charged into the Henschel mixer and were mixed for 5 minutes, thereby obtaining a mixture. Thereafter, a synchronizer ring in which the friction material was integrally joined to the inner surface of the ring body was fabricated in a method similar to that of the above-described Examples.

Comparative Example 4

A synchronizer ring made of brass (Zn 30 wt. %, Al 4.5 wt. %, Ni 2.0 wt. %, Fe 1.0 wt. %, Ti 0.8 wt. %, Nb 0.2 wt. %, and the balance copper) and having on its inner surface a conical surface was fabricated.

Figure 9:
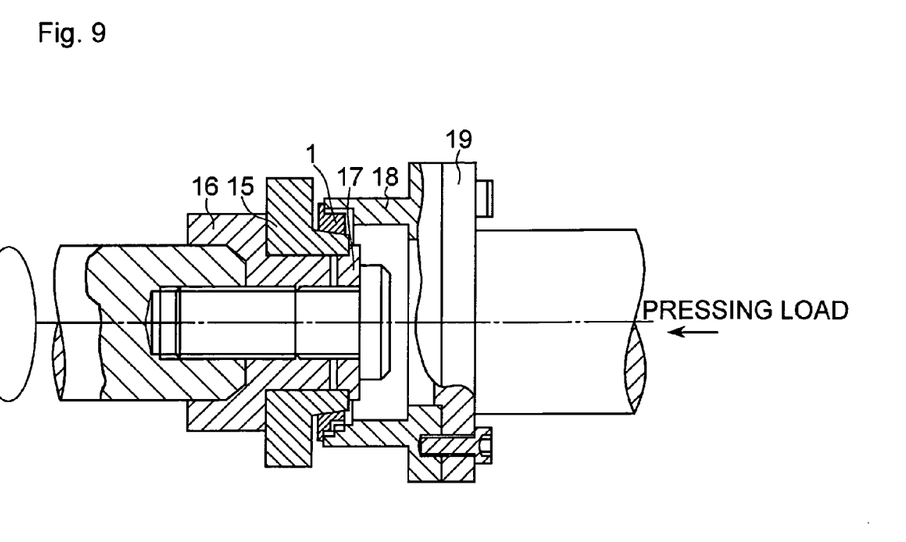
FIG. 9 is an explanatory diagram illustrating testing equipment.

Next, a description will be given of the results of a test conducted of the friction-wear characteristics of synchronizer rings with respect to the synchronizer rings in accordance with the above-described Examples and the synchronizer rings in accordance with the Comparative Examples by using the testing equipment shown in FIG. 9. In FIG. 9, reference numeral 1 denotes a synchronizer ring; 15 denotes a tapered cone; 16 and 17 denote tapered cone mounting jigs; and 18 and 19 denote synchronizer ring pressing jigs.

<Continuous Rotation Test>

<Testing Condition>

Number of revolutions: 1500 rpm

Pressing load: 60 kgf (surface pressure 8.83 Mpa)

<Testing Method>

Using the testing equipment shown in FIG. 9, the synchronizer ring 1 was pressed against the tapered cone 15, which was rotated at the aforementioned number of revolutions, for 0.3 second in 70° C. lubricating oil (ISUZU BESCO 5W-30 (tradename)) and was released for 1.5 second, and this process was set as one cycle, and 2000 cycles were performed in terms of the number of pressing times. As for the coefficients of friction, values at the time of 10 cycles, 500 cycles, 1000 cycles, 1500 cycles, and 2000 cycles in terms of the number of pressing times were measured, while as for the amounts of wear, a value at the time of 2000 cycles in terms of the number of pressing times was measured.

<Swelling Test>

<Testing Method>

Using ISUZU BESCO 5W-30 (tradename) as lubricating oil, an oil bath with the lubricating oil filled therein was prepared. In a state in which the lubricating oil in the oil bath was kept at a temperature of 70° C., test pieces (synchronizer rings in accordance with the above-described Examples and Comparative Examples) were immersed in the oil bath for 200 hours while agitating the lubricating oil in the oil bath, and the amounts of displacement (μm) of the test pieces before and after the test were measured.

Figure 10:
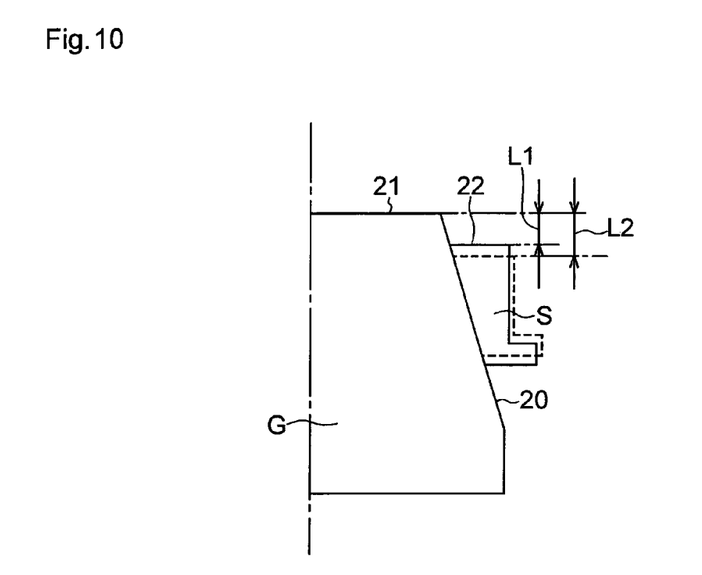
FIG. 10 is an explanatory diagram illustrating a method of measuring an amount of swelling.

The method of measuring the amount of displacement of the inner surface of the test piece before and after the test in the above-described test was carried out by using the measuring jig shown in FIG. 10. Namely, a taper gage G having a tapered surface 20 on its outer surface was prepared, and the conical surface at the inner surface of each of the above-described test pieces S was fitted over the tapered surface 20 of this taper gage G, and a dimension L1 before the test and a dimension L2 after the test between an end face 21 of the taper gage G and an end face 22 of each of the test pieces S were measured, the difference between the dimension L1 and the dimension L2 being set as the amount of displacement (amount of swelling).

The test results of the above-described test on the synchronizer rings in accordance with the above-described Examples and Comparative Examples are shown in Tables 1 to 6.

TABLE 1

| Component composition of friction material | | Example 1 | Example 2 | Example 3 |
|---|---|---|---|---|
| Porous carbon powder (wt. %) | | 50 | 60 | 70 |
| <Phenol resin> (wt. %) | | | | |
| Novolak type phenol resin | | 50 | 40 | 30 |
| <Inorganic whisker> (wt. %) | | | | |
| Calcium sulfate whisker | | — | — | — |
| Potassium titanate whisker | | — | — | — |
| Aluminum borate whisker | | — | — | — |
| Coefficient of dynamic friction | Pressing cycles 10 | 0.116 | 0.127 | 0.132 |
| | 500 | 0.116 | 0.125 | 0.130 |
| | 1000 | 0.114 | 0.121 | 0.128 |
| | 1500 | 0.113 | 0.119 | 0.125 |
| | 2000 | 0.112 | 0.117 | 0.123 |
| Amount of wear of friction material (μm) | | 146 | 220 | 220 |
| Amount of swelling (μm) | | 120 | 30 | 3 |

TABLE 2

| Component composition of friction material | Example 4 | Example 5 | Example 6 |
|---|---|---|---|
| Porous carbon powder (wt. %) | 50 | 50 | 50 |
| <Phenol resin> (wt. %) | | | |
| Novolak type phenol resin | 40 | 40 | 40 |
| <Inorganic whisker> (wt. %) | | | |
| Calcium sulfate whisker | 10 | — | — |
| Potassium titanate whisker | — | 10 | — |
| Aluminum borate whisker | — | — | 10 |

TABLE 2-continued

| Component composition of friction material | | Example 4 | Example 5 | Example 6 |
|---|---|---|---|---|
| Coefficient of dynamic friction | Pressing cycles 10 | 0.112 | 0.125 | 0.130 |
| | 500 | 0.116 | 0.123 | 0.128 |
| | 1000 | 0.115 | 0.120 | 0.126 |
| | 1500 | 0.115 | 0.117 | 0.123 |
| | 2000 | 0.114 | 0.116 | 0.121 |
| Amount of wear of friction material (μm) | | 130 | 180 | 168 |
| Amount of swelling (μm) | | 42 | 38 | 37 |

TABLE 3

| Component composition of friction material | | Example 7 | Example 8 | Example 9 |
|---|---|---|---|---|
| Porous carbon powder (wt. %) | | 50 | 50 | 50 |
| <Phenol resin> (wt. %) | | | | |
| Novolak type phenol resin | | 30 | 30 | 30 |
| <Inorganic whisker> (wt. %) | | | | |
| Calcium sulfate whisker | | 20 | — | — |
| Potassium titanate whisker | | — | 20 | — |
| Aluminum borate whisker | | — | — | 20 |
| Coefficient of dynamic friction | Pressing cycles 10 | 0.114 | 0.125 | 0.127 |
| | 500 | 0.118 | 0.120 | 0.125 |
| | 1000 | 0.116 | 0.118 | 0.124 |
| | 1500 | 0.115 | 0.116 | 0.122 |
| | 2000 | 0.115 | 0.115 | 0.120 |
| Amount of wear of friction material (μm) | | 104 | 163 | 132 |
| Amount of swelling (μm) | | 3 | 5 | 6 |

TABLE 4

| Component composition of friction material | | Example 10 | Example 11 | Example 12 |
|---|---|---|---|---|
| Porous carbon powder (wt. %) | | 60 | 50 | 50 |
| <Phenol resin> (wt. %) | | | | |
| Novolak type phenol resin | | 30 | 30 | 30 |
| <Porous ceramic> (wt. %) | | | | |
| Activated alumina | | 10 | 20 | 10 |
| <Inorganic whisker> (wt. %) | | | | |
| Potassium titanate whisker | | — | — | 10 |
| Coefficient of dynamic friction | Pressing cycles 10 | 0.126 | 0.133 | 0.130 |
| | 500 | 0.118 | 0.128 | 0.126 |
| | 1000 | 0.117 | 0.122 | 0.122 |
| | 1500 | 0.117 | 0.120 | 0.122 |
| | 2000 | 0.117 | 0.120 | 0.120 |
| Amount of wear of friction material (μm) | | 100 | 120 | 132 |
| Amount of swelling (μm) | | 100 | 110 | 78 |

TABLE 5

| | | Comparative Example 1 | Comparative Example 2 |
|---|---|---|---|
| Coefficient of dynamic friction | Pressing cycles 10 | 0.120 | 0.106 |
| | 500 | 0.115 | 0.105 |
| | 1000 | 0.110 | 0.104 |
| | 1500 | 0.093 | 0.103 |
| | 2000 | 0.086 | 0.102 |
| Amount of wear (μm) | | 320 | 485 |
| Amount of swelling (μm) | | 5 | 270 |

TABLE 6

| | | Comparative Example 3 | Comparative Example 4 |
|---|---|---|---|
| Coefficient of dynamic friction | Pressing cycles 10 | 0.125 | 0.088 |
| | 500 | 0.125 | 0.088 |
| | 1000 | 0.120 | 0.086 |
| | 1500 | 0.118 | 0.086 |
| | 2000 | 0.115 | 0.087 |
| Amount of wear (μm) | | 530 | 59 |
| Amount of swelling (μm) | | 2 | 0 |

From the above-described test results, it was confirmed that the synchronizer rings in accordance with the Examples exhibit high coefficients of dynamic friction and excel in the wear resistance, and that no damage was caused to the surfaces (friction surfaces) of the mating member the test. On the other hand, the synchronizer ring in accordance with the Comparative Example 1 showed satisfactory values in the coefficient of dynamic friction in an early period, but has the problem that the coefficient of dynamic friction delines with an increase in the pressing cycles, and is therefore difficult to be used as a synchronizer rings. As for the synchronizer ring in accordance with the Comparative Example 2, it was confirmed that although the porous carbon powder is contained, since its content is small, the friction behavior of the phenol resin of the cementing material becomes noticeable, its coefficient of dynamic friction is low, its wear resistance is inferior, and its amount of swelling is very large. In addition, as for the synchronizer ring in accordance with the Comparative Example 3, since the content of the porous carbon powder is excessively large contrary to the above-described Comparative Example 2, the strength of the friction material becomes small, with the result that its wear resistance is insufficient. Furthermore, the synchronizer ring in accordance with the Comparative Example 4 exhibits sufficient wear resistance, but its coefficient of dynamic friction is low, so that it still has a problem as a synchronizer ring.

DESCRIPTION OF REFERENCE NUMERALS AND SIGNS

1: synchronizer ring
2: ring body
3: cylindrical inner peripheral surface
4: friction material
5: conical surface
6: annular groove
7: vertical groove

The invention claimed is:

1. A synchronizer ring comprising: an annular ring body, wherein a friction material is integrally joined to at least one of an inner peripheral surface and an outer peripheral surface of said ring body, said friction material containing a phenol resin in which 40 to 70 wt. % of a porous carbon powder containing mineral components is dispersedly contained.

2. The synchronizer ring according to claim 1, wherein said ring body is formed of one of iron, a ferroalloy, a non-ferrous alloy, and a sintered alloy thereof.

3. The synchronizer ring according to claim 1, wherein said porous carbon powder containing mineral components contains 65 to 75 wt. % of a carbon component, 5 to 10 wt. % of mineral components, and 15 to 30 wt. % of oxygen.

4. The synchronizer ring according to claim 1, wherein said phenol resin is one or two or more kinds selected from a novolak type phenol resin, an epoxy modified phenol resin, and a melamine modified phenol resin.

5. The synchronizer ring according to claim 1, wherein said friction material contains an inorganic whisker and/or a porous ceramic at a ratio of 5 to 30 wt. %.

6. The synchronizer ring according to claim 5, wherein said inorganic whisker is one or two or more kinds selected from a calcium sulfate whisker, a potassium titanate whisker, a zinc oxide whisker, a magnesium sulfate whisker, an aluminum borate whisker, a calcium silicate whisker, and a titanium oxide whisker.

7. The synchronizer ring according to claim 5, wherein said porous ceramic is selected from at least one of activated alumina and activated magnesia.

\* \* \* \* \*